United States Patent
Akkarakaran et al.

(10) Patent No.: US 11,728,882 B2
(45) Date of Patent: Aug. 15, 2023

(54) JOINT SOURCE CHANNEL CODING FOR RELAYING

(71) Applicant: QUALCOMM Incorporated, San Diego, CA (US)

(72) Inventors: Sony Akkarakaran, Poway, CA (US); Mahmoud Taherzadeh Boroujeni, San Diego, CA (US); Junyi Li, Fairless Hills, PA (US); Tao Luo, San Diego, CA (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 17/308,338

(22) Filed: May 5, 2021

(65) Prior Publication Data

US 2021/0351839 A1 Nov. 11, 2021

Related U.S. Application Data

(60) Provisional application No. 63/022,246, filed on May 8, 2020.

(51) Int. Cl.
| H04L 5/12 | (2006.01) |
| H04B 7/155 | (2006.01) |
| H04L 1/00 | (2006.01) |

(52) U.S. Cl.
CPC ....... *H04B 7/15564* (2013.01); *H04L 1/0003* (2013.01); *H04L 1/0009* (2013.01); *H04L 1/0054* (2013.01)

(58) Field of Classification Search
None
See application file for complete search history.

(56) References Cited

U.S. PATENT DOCUMENTS

| 8,386,880 | B2* | 2/2013 | Savin | H03M 13/1171 |
| | | | | 714/752 |
| 9,826,459 | B2* | 11/2017 | Lim | H04L 1/0076 |
| 10,050,820 | B2* | 8/2018 | Hong | H04L 27/3494 |
| 10,355,908 | B1* | 7/2019 | Peyla | H04L 27/38 |
| 11,184,108 | B2* | 11/2021 | Kim | H03M 13/6325 |
| 2013/0121125 | A1* | 5/2013 | Chung | G11B 20/1833 |
| | | | | 369/103 |
| 2013/0343489 | A1* | 12/2013 | Maiberger | H04L 27/06 |
| | | | | 375/320 |

FOREIGN PATENT DOCUMENTS

| WO | WO-2011020213 A1 * | 2/2011 | ......... H04B 7/15521 |
| WO | WO-2020228374 A1 * | 11/2020 | |

* cited by examiner

*Primary Examiner* — Sithu Ko
(74) *Attorney, Agent, or Firm* — Patterson & Sheridan, L.L.P/Qualcomm Incorporated

(57) ABSTRACT

Aspects of the present disclosure relate to wireless communications, and more particularly, to techniques for joint source channel coding for efficiently relaying a set of bits mapped to a modulation symbol. A method that may be performed by a wireless relay node includes obtaining a set of bits to convey to a second wireless node. The method may include mapping the set of bits to a first modulation symbol of a set of modulation symbols, wherein the mapping is chosen based on an interpreted value of the set of bits. The method may include transmitting the first modulation symbol to the second wireless node.

20 Claims, 12 Drawing Sheets

JOINT SOURCE CHANNEL CODING FOR RELAYING

CROSS-REFERENCE TO RELATED APPLICATION(S)

This application claims benefit of and priority to U.S. Provisional Application No. 63/022,246, filed May 8, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for joint source channeling for efficiently transmitting a set of bits mapped to a modulation symbol.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., new radio or 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved communication in integrated access and backhaul systems.

Certain aspects of the subject matter described in this disclosure can be implemented in a method for wireless communication by a wireless relay node. The method generally includes obtaining a set of bits to convey to a second wireless node. The method generally includes mapping the set of bits to a first modulation symbol of a set of modulation symbols, wherein the mapping is chosen based on an interpreted value of the set of bits. The method generally includes transmitting the first modulation symbol to the second wireless node.

Certain aspects of the subject matter described in this disclosure can be implemented in a method for wireless communication by a wireless receiver node. The method generally includes receiving a first modulation symbol from a second wireless node. The method generally includes performing a demapping of the first modulation symbol to obtain a set of bits, wherein the demapping is chosen based on an interpreted value of the set of bits.

Certain aspects of the subject matter described in this disclosure can be implemented in an apparatus for wireless communication. The apparatus generally includes at least one processor, and a memory coupled to the at least one processor. The memory generally includes code executable by the at least one processor to cause the apparatus to obtain a set of bits to convey to a first wireless node. The memory generally includes code executable by the at least one processor to cause the apparatus to map the set of bits to a first modulation symbol of a set of modulation symbols, wherein the mapping is chosen based on an interpreted value of the set of bits. The memory generally includes code executable by the at least one processor to cause the apparatus to transmit the first modulation symbol to the first wireless node.

Certain aspects of the subject matter described in this disclosure can be implemented in an apparatus for wireless communication. The memory generally includes code executable by the at least one processor to cause the apparatus to receive a first modulation symbol from a first wireless node. The memory generally includes code executable by the at least one processor to cause the apparatus to perform a demapping of the first modulation symbol to obtain a set of bits, wherein the demapping is chosen based on an interpreted value of the set of bits.

Certain aspects of the subject matter described in this disclosure can be implemented in an apparatus for wireless communication. The apparatus generally includes means for obtaining a set of bits to convey to a first wireless node. The apparatus generally includes means for mapping the set of bits to a first modulation symbol of a set of modulation symbols, wherein the mapping is chosen based on an interpreted value of the set of bits. The apparatus generally includes means for transmitting the first modulation symbol to the first wireless node.

Certain aspects of the subject matter described in this disclosure can be implemented in an apparatus for wireless communication. The apparatus generally includes means for receiving a first modulation symbol from a first wireless node. The apparatus generally includes means for performing a demapping of the first modulation symbol to obtain a set of bits, wherein the demapping is chosen based on an interpreted value of the set of bits.

Certain aspects of the subject matter described in this disclosure can be implemented in a computer readable medium storing computer executable code for wireless communication. The computer readable medium generally includes code for obtaining a set of bits to convey to a first wireless node. The computer readable medium generally includes code for mapping the set of bits to a first modulation symbol of a set of modulation symbols, wherein the mapping is chosen based on an interpreted value of the set of bits. The computer readable medium generally includes code for transmitting the first modulation symbol to the first wireless node.

Certain aspects of the subject matter described in this disclosure can be implemented in a computer readable medium storing computer executable code for wireless communication. The computer readable medium generally includes code for receiving a first modulation symbol from a first wireless node. The computer readable medium generally includes code for performing a demapping of the first modulation symbol to obtain a set of bits, wherein the demapping is chosen based on an interpreted value of the set of bits.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
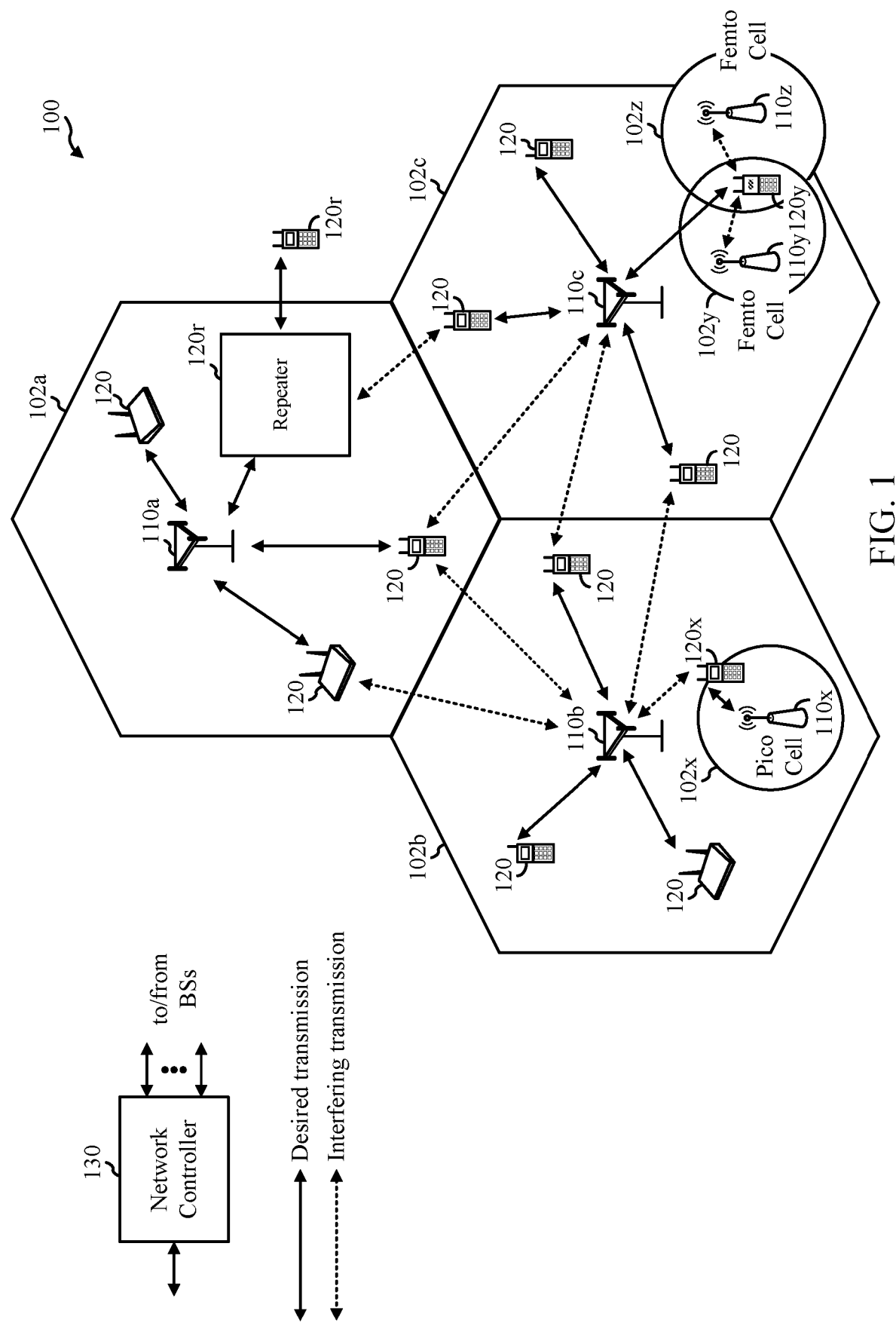
FIG. 1 is a block diagram conceptually illustrating an example wireless communication network, in accordance with certain aspects of the present disclosure.

Aspects of the present disclosure provide apparatus, methods, processing systems, and computer readable mediums to enhance wireless transmission, for example, by efficiently transmitting a set of bits mapped to a modulation symbol, where the mapping is based on an interpreted value of the bits.

The following description provides examples, and is not limiting of the scope, applicability, or examples set forth in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132.

According to certain aspects, the BSs 110 and UEs 120 may be configured for joint source channeling for efficiently transmitting a set of bits mapped to a modulation symbol. As shown in FIG. 1, a UE 120r may serve as a relay or repeater and may be configured to perform operations 700 of FIG. 7 wirelessly transmit a set of bits mapped to a modulated symbol. The set of bits could be decoded samples may be compressed using a compression scheme. The interpreted value of the bits could be, for example, log likelihood ratio (LLR) values of a packet to be relayed or an intensity value of a pixel. The wireless communication network may also include one or more other nodes (e.g., another UE 120 or a base station 110) configured to perform operations 800 of FIG. 8 to receive and process the modulation symbols.

As illustrated in FIG. 1, the wireless communication network 100 may include a number of access points (APs) 110 and other network entities. An AP may be a base station (BS) that communicates with user equipment (UEs). An AP 110 may provide communication coverage for a particular geographic area, sometimes referred to as a "cell," which may be stationary or may move according to the location of a mobile AP 110. In some examples, the APs may be interconnected to one another and/or to one or more other APs or network nodes (not shown) in wireless communication network 100 through various types of backhaul interfaces (e.g., a direct physical connection, a wireless connection, a virtual network, or the like) using any suitable transport network. In the example shown in FIG. 1, the APs 110a, 110b and 119c may be macro APs for the macro cells 102a, 102b and 102c, respectively. The AP 110x may be a pico AP for a pico cell 102x. The APs 110y and 110z may be femto APs for the femto cells 102y and 102z, respectively. An AP may support one or multiple (e.g., three) cells.

The APs 110 communicate with UEs 120 in the wireless communication network 100. The UEs 120 (e.g., 120x, 120y, etc.) may be dispersed throughout the wireless communication network 100, and each UE may be stationary or mobile. Wireless communication network 100 may also include relay stations. A relay station is a station that receives a transmission of data and/or other information from an upstream station (e.g., an AP or a UE) and sends a transmission of the data and/or other information to a downstream station (e.g., a UE or an AP). A relay station may also be a UE that relays transmissions for other UEs. In the example shown in FIG. 1, a relay station 110r may communicate with the AP 110a and a UE 120r in order to facilitate communication between the AP 110a and the UE 120r. A relay station may also be referred to as an Integrated Access and Backhaul (IAB) node, a relay AP, a relay, etc.

Wireless communication network 100 may be a heterogeneous network that includes APs of different types, e.g., macro AP, pico AP, femto AP, relays, etc. These different types of APs may have different transmit power levels, different coverage areas, and different impact on interference in the wireless communication network 100. For example, macro AP may have a high transmit power level (e.g., 20 Watts) whereas pico AP, femto AP, and relays may have a lower transmit power level (e.g., 1 Watt).

A network controller 130 may couple to a set of APs and provide coordination and control for these APs. The network controller 130 may communicate with the APs 110 via a backhaul. The APs 110 may also communicate with one another (e.g., directly or indirectly) via wireless or wireline backhaul.

Figure 2:
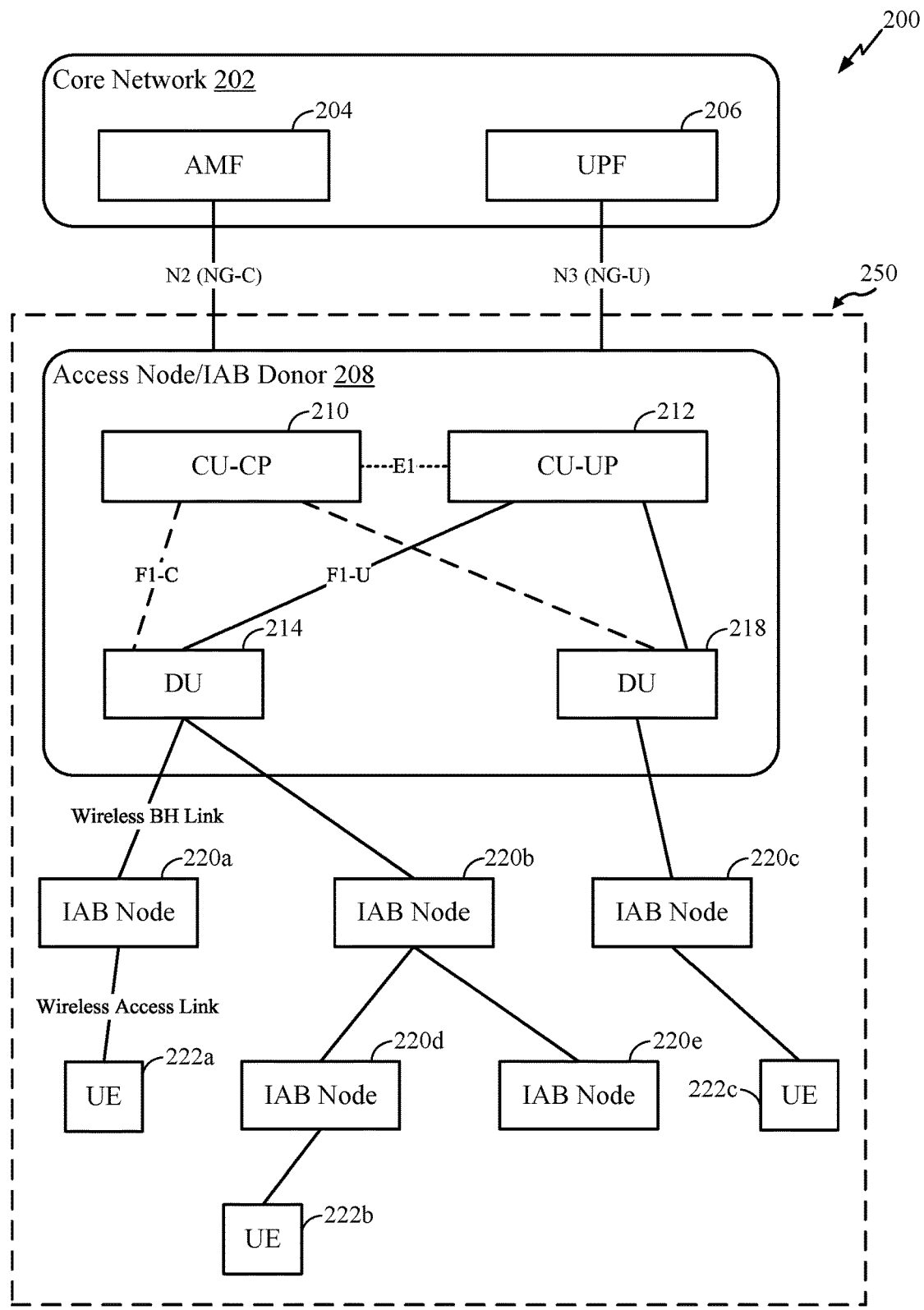
FIG. 2 is a block diagram conceptually illustrating an example architecture of a distributed radio access network (RAN), in accordance with certain aspects of the present disclosure.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported FIG. 2 illustrates an example architecture of a distributed radio access network (RAN) 200 that includes an example IAB network 250, which may be implemented in the wireless communication network 100 illustrated in FIG. 1. As shown in FIG. 2, the distributed RAN includes core network (CN) 202 and access node (AN) configured as an IAB donor 208.

As shown, the IAB network 250 includes an IAB donor node 208. The IAB donor node 208 is a RAN node (e.g., access point/gNB that terminates the NR Ng interface with the core network (e.g., next generation NG core)) and is generally connected to the core network via a wireline backhaul link. The CN 202 may host core network functions. CN 202 may be centrally deployed. CN 202 functionality may be offloaded (e.g., to advanced wireless services (AWS)), in an effort to handle peak capacity. The CN 202 may include the access and mobility management function (AMF) 204 and user plane function (UPF) 206. The AMF 204 and UPF 206 may perform one or more of the core network functions.

The IAB donor 208 may communicate with the CN 202 (e.g., via a backhaul interface). The IAB donor 208 may communicate with the AMF 204 via an N2 (e.g., NG-C) interface. The IAB donor 208 may communicate with the UPF 206 via an N3 (e.g., NG-U) interface. The IAB donor 208 may include a central unit-control plane (CU-CP) 210, one or more central unit-user plane (CU-UPs) 212, one or more distributed units (DUs) 214-218, and one or more antenna/remote radio units (AU/RRUs) (not shown). The CUs and DUs may also be referred to as gNB-CU and gNB-DU, respectively.

An IAB donor node 208 may also be referred to as an IAB anchor node and may include an IAB central unit (e.g., NR CU) or an IAB Distributed Unit (e.g., NR DU). The IAB network 250 further includes one or more non-donor IAB nodes (e.g., 220a-220e). Each IAB node (including donor and non-donor IAB nodes) may serve one or more UEs (e.g., 222a-222c) connected to an IAB node. As shown, the IAB nodes, including the donor IAB node 208, may be connected via wireless backhaul links (e.g., NR wireless backhaul links or backup NR wireless backhaul links). Each IAB node connects to its served UEs via respective access links.

Each IAB node is a RAN node (e.g., access point/gNB) that provides IAB functionality with two roles including data unit function (DU-F) and a mobile termination function (MT-F). The DU-F of an IAB node is generally responsible for scheduling UEs (e.g., served by the IAB node) and other IAB nodes (e.g., that are connected as child nodes to the IAB node). The DU-F also controls both access and backhaul links under its coverage. The MT-F of an IAB node is controlled and scheduled by an IAB donor node or another IAB node as its parent IAB node. In an aspect, the IAB donor node 208 only includes DU-F and no MT-F.

The CU-CP 210 may be connected to one or more of the DUs 214-218. The CU-CP 210 and DUs 214-218 may be connected via a wireline interface using F1-C protocols. As shown in FIG. 2, the CU-CP 210 may be connected to multiple DUs, but the DUs may be connected to only one CU-CP. Although FIG. 2 only illustrates one CU-UP 212, the IAB donor 208 may include multiple CU-UPs. The CU-CP 210 selects the appropriate CU-UP(s) for requested services (e.g., for a UE). The CU-UP(s) 212 may be connected to the CU-CP 210. For example, the CU-UP(s) 212 and the CU-CP 210 may be connected via an E1 interface. The CU-CP(s) 212 may be connected to one or more of the DUs 214, 218. The CU-UP(s) 212 and DUs 214, 218 may be connected via a F1-U interface. As shown in FIG. 2, the CU-CP 210 may be connected to multiple CU-UPs, but the CU-UPs may be connected to only one CU-CP.

A DU, such as DUs 214 and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214, 218 may be connected with one of AU/RRUs.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via an Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, IAB donor 208 may support dual connectivity with NR and may share a common fronthaul for LTE and NR. The distributed RAN 200 may enable cooperation between and among DUs 214, 218, for example, via the CU-CP 212. An inter-DU interface may not be used.

Logical functions may be dynamically distributed in the distributed RAN 200. As will be described in more detail with reference to FIG. 4, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
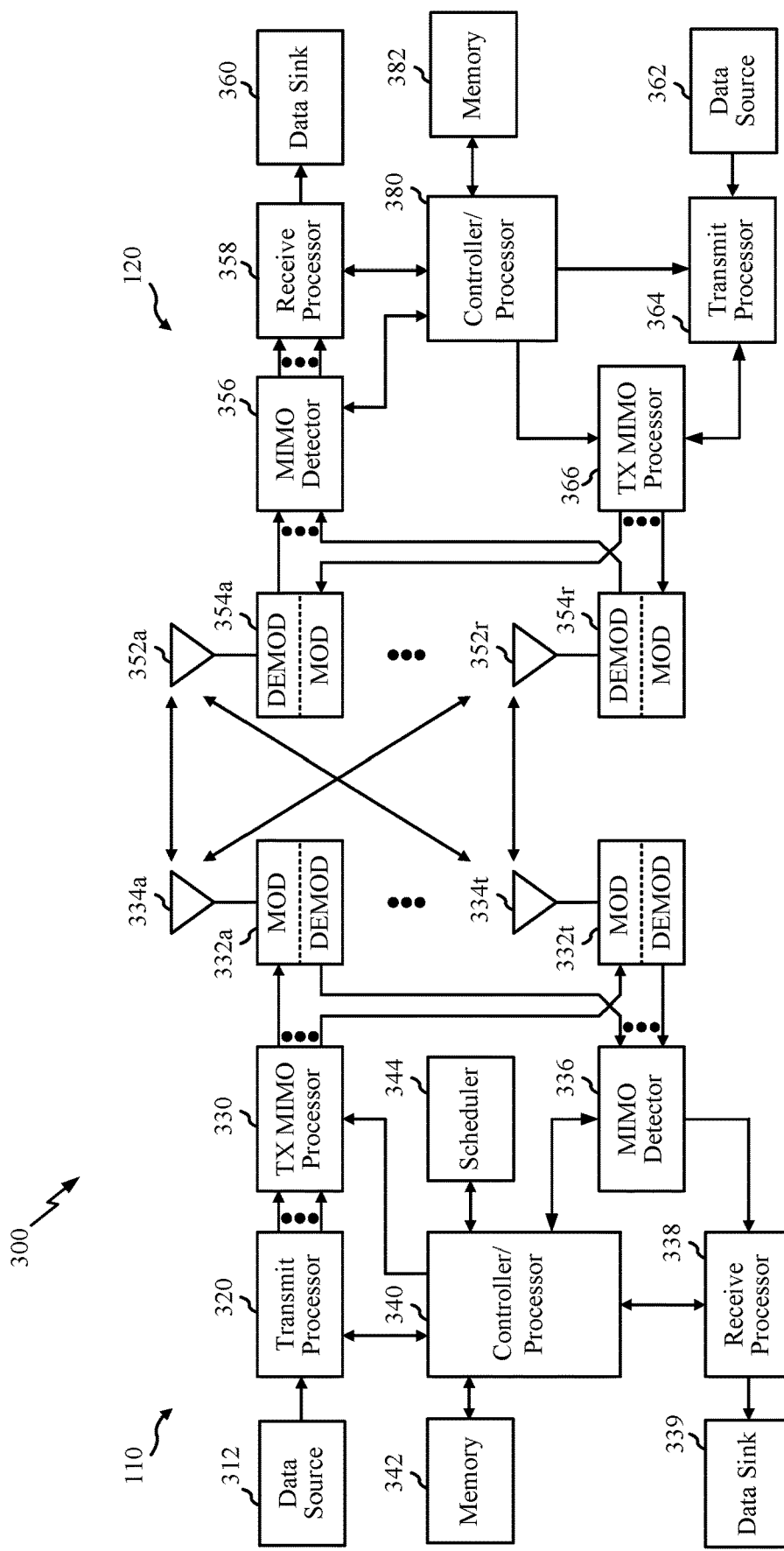
FIG. 3 illustrates example components of a base station (BS) and a user equipment (UE), in accordance with certain aspects of the present disclosure.

FIG. 3 illustrates example components 300 of AP 110 and UE 120 (as depicted in FIG. 1), which may be used to implement aspects of the present disclosure. For example, antennas 352, processors 366, 358, 364, and/or controller/processor 380 of the UE 120 and/or antennas 334, processors 320, 330, 338, and/or controller/processor 340 of the AP 110 may be used to perform the various techniques and methods described herein with reference to FIGS. 7 and/or 8.

At the AP 110, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 320 may process (e.g., encode and symbol map) the data and control information to obtain data symbols and control symbols, respectively. The processor 320 may also generate reference symbols, e.g., for the primary synchronization signal (PSS), secondary synchronization signal (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 332a-332t may be transmitted via the antennas 334a-334t, respectively.

At the UE 120, the antennas 352a-352r may receive the downlink signals from the AP 110 and may provide received signals to the demodulators (DEMODs) in transceivers 354a through 354r, respectively. Each demodulator in transceivers 354a-354r may condition (e.g., filter, amplify, downconvert, and digitize) a respective received signal to obtain input samples. Each demodulator may further process the input samples (e.g., for OFDM, etc.) to obtain received symbols. A MIMO detector 356 may obtain received symbols from all the demodulators in transceivers 354a-354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at UE 120, a transmit processor 364 may receive and process data (e.g., for the physical uplink shared channel (PUSCH)) from a data source 362 and control information (e.g., for the physical uplink control channel (PUCCH) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the demodulators in transceivers 354*a* through 354*r* (e.g., for SC-FDM, etc.), and transmitted to the access point 110. At the AP 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The memories 342 and 382 may store data and program codes for AP 110*a* and UE 120*a*, respectively. A scheduler 344 may schedule UEs for data transmission on the downlink and/or uplink.

Antennas 352, processors 366, 358, 364, and/or controller/processor 380 of the UE 120*a* and/or antennas 334, processors 320, 330, 338, and/or controller/processor 340 of the BS 110*a* may be used to perform the various techniques and methods described herein. In some aspects, other components of the UE 120*a* and BS 110*a* may be used to perform the operations described herein.

Figure 4:
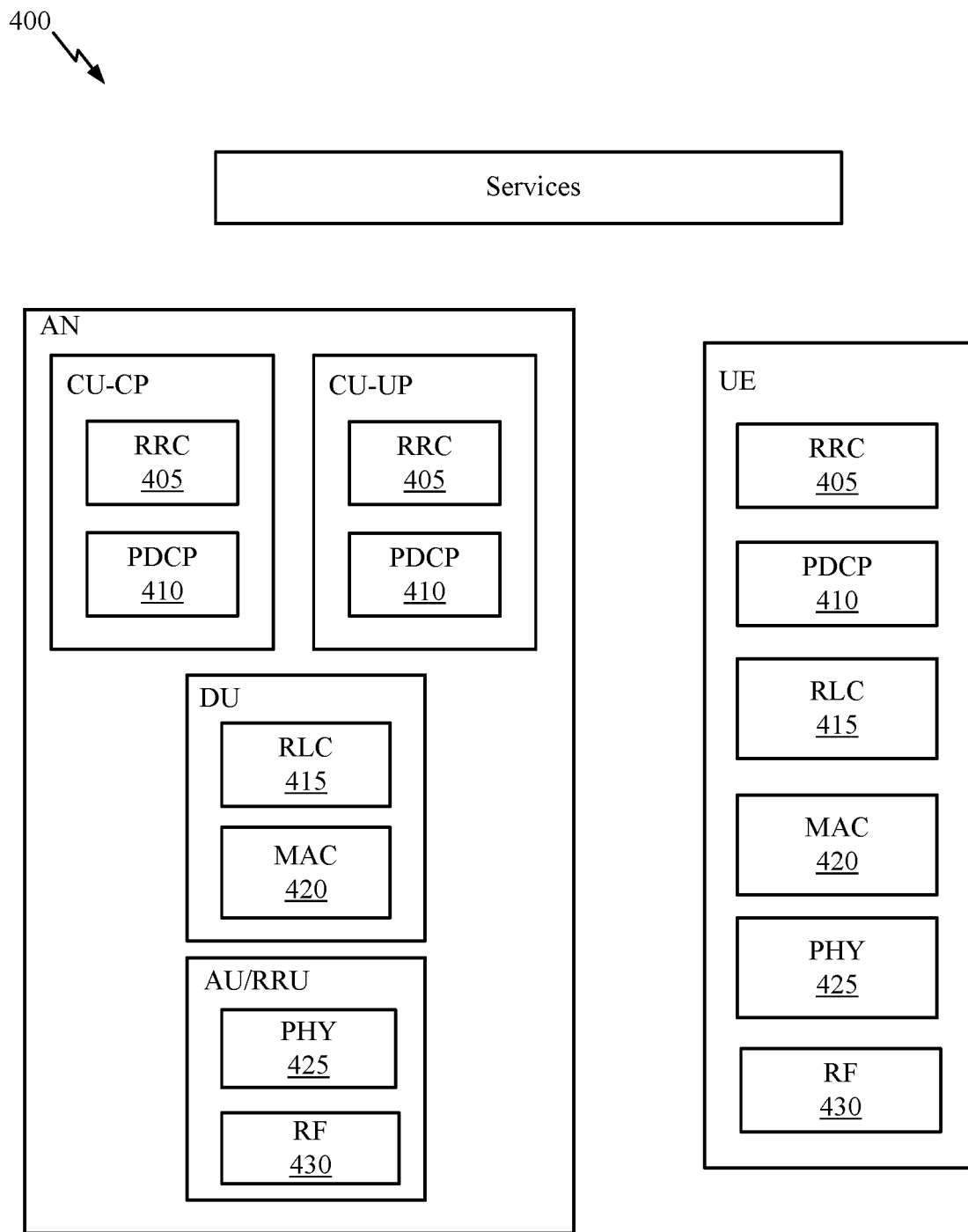
FIG. 4 is a block diagram illustrating an example communications protocol stack in a RAN, in accordance with certain aspects of the present disclosure.

NR may utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The minimum resource allocation (called a "resource block" (RB)) may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.). FIG. 4 illustrates a diagram showing examples for implementing a communications protocol stack 400 in a RAN (e.g., such as the RAN 200), according to aspects of the present disclosure. The illustrated communications protocol stack 400 may be implemented by devices operating in a wireless communication system, such as a 5G NR system (e.g., the wireless communication network 100). In various examples, the layers of the protocol stack 400 may be implemented as separate modules of software, portions of a processor or application specific integrated circuit (ASIC), portions of non-collocated devices connected by a communications link, or various combinations thereof. Collocated and non-collocated implementations may be used, for example, in a protocol stack for a network access device or a UE. As shown in FIG. 4, the system may support various services over one or more protocols. One or more protocol layers of the protocol stack 400 may be implemented by an AN (e.g., AN 208 in FIG. 2, or AP 110*a* in FIG. 1) and/or the UE (e.g., UE 120).

As shown in FIG. 4, the protocol stack 400 is split in the AN. The RRC layer 405, PDCP layer 410, RLC layer 415, MAC layer 420, PHY layer 425, and RF layer 430 may be implemented by the AN. For example, the CU-CP (e.g., CU-CP 210 in FIG. 2) and the CU-UP e.g., CU-UP 212 in FIG. 2) each may implement the RRC layer 405 and the PDCP layer 410. A DU (e.g., DUs 214 and 218 in FIG. 2) may implement the RLC layer 415 and the MAC layer 420. However, the DU may also implement the PHY layer(s) 425 and the RF layer(s) 430 via an AU/RRU connected to the DU. The PHY layers 425 may include a high PHY layer and a low PHY layer.

The UE (e.g., UE 222*a*-222*c*) may implement the entire protocol stack 400 (e.g., the RRC layer 405, the PDCP layer 410, the RLC layer 415, the MAC layer 420, the PHY layer(s) 425, and the RF layer(s) 430).

Figure 5:
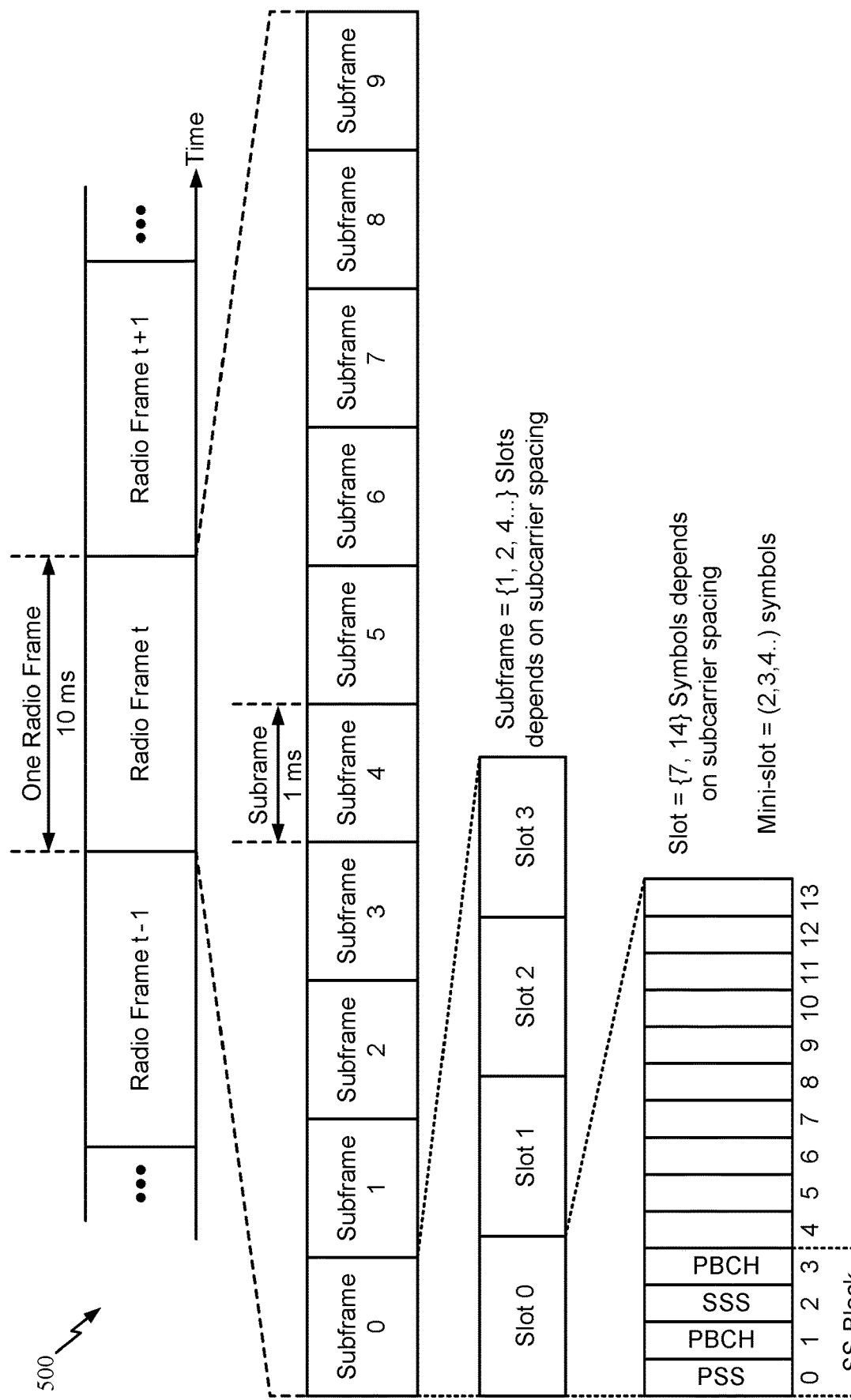
FIG. 5 is a block diagram is a diagram illustrating an example of a frame format for certain wireless communication systems (e.g., new radio (NR)), in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or AP), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a RRC dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Some wireless networks have stated objectives to provide ultra-high data rate and support wide scope of application scenarios. IAB systems have been studied in 3GPP as one possible solution to help support these objectives.

As noted above, in IAB, a wireless backhaul solution is adopted to connect cells (IAB-nodes) to the core network (which uses a wired backhaul). Some attractive characteristics of IAB are support for multi-hop wireless backhaul, sharing of the same technology (e.g., NR) and resources (e.g., frequency bands) for both access and backhaul links.

There are various possible architectures for IAB-nodes, including layer-2 (L2) and layer-3 (L3) solutions and a particular architecture deployed may depend on what layers of protocol stack are implemented in the intermediate nodes (IAB-nodes), for example, L2 relays may implement PHY, MAC, and/or RLC layers.

Certain aspects of the present disclosure relate to L1 relays (also referred to as repeaters). L1 relays and/or repeaters may be relatively simple, low-cost, low-power, and may be wirelessly connected to a donor or another relay (e.g., a gNB).

Example Relaying

Relays may be generally deployed to provide coverage extension. For example, if a direct link between two nodes (e.g., A→C, between nodes A and C) is poor, a relay (e.g., node B) may be used to provide a better path (A→B→C). Relays may also be used to provide diversity and/or robustness, for example, using both a direct link (e.g., A→C) and an indirect link (A→B→C), so that if one path fails, the other is available. As noted above, relays may also apply in the context of integrated access and backhaul (IAB) relaying, as well as sidelink relaying (e.g., relaying between two UEs).

Relays are typically classified as analog or decode-and-forward. An analog relay simply receives the waveform in a particular band and forwards it as is. Decode-and-forward relays, on the other hand, may receive, decode, re-encode, and forward the transmission (e.g., a packet) to the next node (e.g., Release 16 IAB relaying). This forwarding may happen at layer-1 (L1) (e.g., a physical (PHY) layer), layer-2 (L2) (e.g., a medium access control (MAC) and/or radio link control (RLC) layer) or layer-3 (L3) (e.g., radio resource control (RRC)) layers, depending on amount of further processing occurring at the relay node in between the receive function and transmit function.

Figure 6:
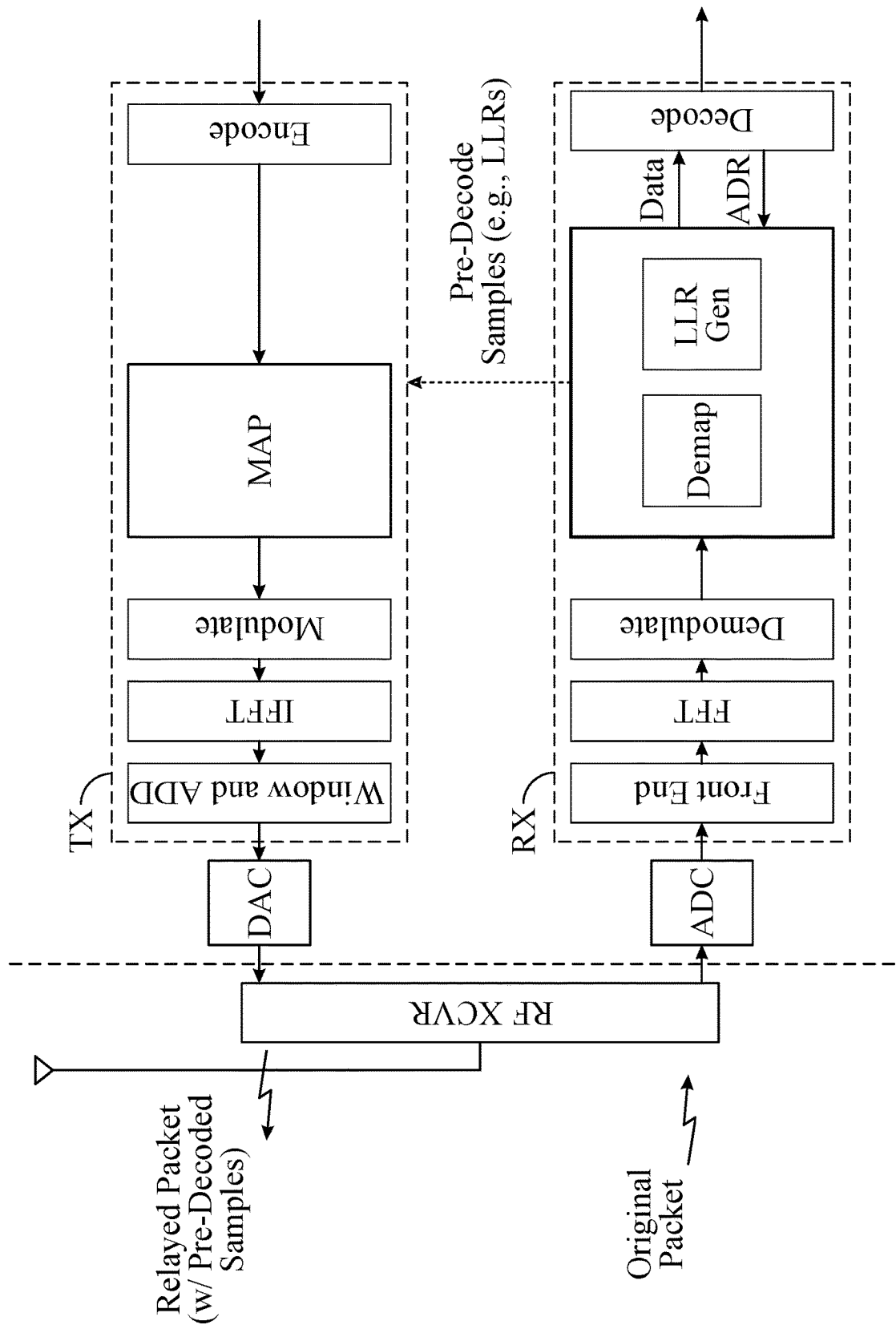
FIG. 6 is a block diagram of an example wireless relay, in which aspects of the present disclosure may be implemented.

As illustrated in FIG. 6, in some cases, a relay may function "in-between" analog relays and decode-and-forward relays. With such relays, some amount of baseband processing may occur, but relaying begins prior to decoding. For example, as illustrated, the relay may receive an original packet and forward a relayed packet with pre-decoded samples taken from the waveform of the original packet.

Examples of such relaying include forwarding of in-phase/quadrature (I/Q) samples at analog/digital (A/D) conversion; forwarding modulation symbols after orthogonal frequency-division multiplexing (OFDM) Fast Fourier Transform (FFT) or after equalization; forwarding log-likelihood ratios (LLR) input to decoder of channel code (e.g., low-density parity-check code (LDPC) decoder), or computed by intermediate operation of the decoder prior to packet decoding.

By relaying pre-decoded samples (e.g., LLRs or I-Q samples), such relays may reduce relaying latency (eliminating decoding time) to the transmission destination (node C in the example above). Such relaying may also be used to implement cooperative decoding, for example, if the destination is node B (that may send pre-decoded samples to another node for decoding).

When relaying LLR values, each LLR represents one information bit inside a decoder. LLRs may represent how likely the signal is either 0 or 1. A large positive LLR value indicates the decoder believes the information bit represented by the LLR value is 1, while a large negative LLR value indicates the decoder believes that the information bit represented by the LLR value is 0. LLRs may take on range of values and may require more bits (e.g., 8 bits) to represent 1 information bit. Without compression, a relayed packet containing 8-bit LLRs may be larger (e.g., eight times larger).

Example Joint Source Channel Coding for Relaying and Other Use Cases

According to certain aspects of the present disclosure, to communicate a block of data from node A to node B, node A may first compresses the block of data in a packet before sending. Upon receiving the packet from node A, node B decompresses to recover the original block of data. For example, node A may use log-likelihood ratios (LLRs) for compressing the block of data before sending. The compression scheme may be independent from the transmission scheme. Information theory shows that joint design of compression and transmission may be unnecessary (e.g., does not further improve overall performance) if each of these is independently optimal. However, in practice, the compression and transmission parts are often not optimal.

Aspects of the present disclosure provide joint source and channel coding techniques that may help improve performance. Such techniques may be used to efficiently transmit a set of bits with a strategic mapping to a modulation symbol, for example, based on an interpreted value (e.g., LLR values) of the set of bits.

As will be described in greater detail below, nearby source samples (e.g., samples from a data packet received by a wireless relay node) may be mapped to nearby symbols in a modulation constellation, which may help the transmission be more robust to noise. While examples described herein refer to mapping pre-decoded samples (e.g., LLRs or I-Q samples) of a packet to be relayed, the techniques may be applied to other use cases. For example, the same or similar type of mapping may be performed to map bits representing other types of values, such as an intensity value of a pixel (e.g., for efficient transmission during a gaming or other media session).

Figure 7:
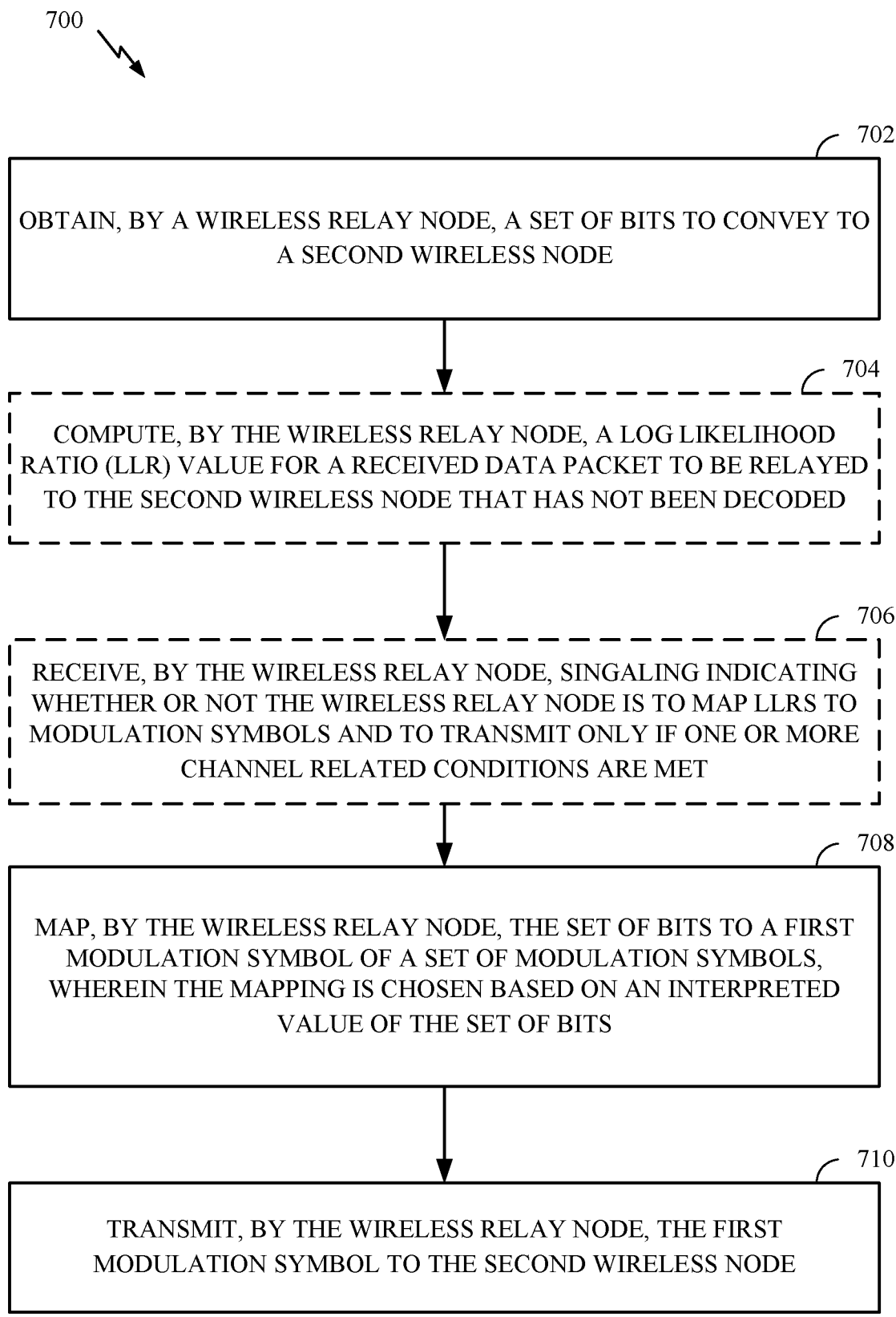
FIG. 7 is a flow diagram illustrating example operations for wireless communications by a wireless relay node, in accordance with certain aspects of the present disclosure.

FIG. 7 illustrates example operations 700 for wireless communication by a wireless relay node, in accordance with certain aspects of the present disclosure. The operations 700 may be performed, for example, by a UE acting as a repeater (e.g., any of the repeaters shown in FIG. 1 or 6).

Operations 700 begin, at 702, with the wireless relay node obtaining a set of bits to convey to a second wireless node. The set of bits may represent pre-decoded samples (e.g., LLRs, I-Q samples, etc.) of a data packet received by the wireless relay node.

In some aspects, at 704, the wireless relay node may compute the LLR value for a received data packet, to be relayed to the second wireless node. The wireless node may use a different modulation scheme to relay LLRs to the second wireless node than that is used to transmit a data packet. The wireless relay node may map the LLRs to modulation symbols according to the mapping and transmits the modulation symbols In some aspects, at 706, the wireless relay node may receive signaling indicating whether or not the wireless relay node is to map LLRs to modulation symbols according to the mapping and transmits the modulation symbols to the second wireless node only if one or more channel related conditions are met. The channel-related conditions involve applying a signal to noise ratio (SNR) threshold to an inbound link and/or an outbound link of the wireless relay node.

At 708, the wireless relay node maps the set of bits to a first modulation symbol of a set of modulation symbols, wherein the mapping is chosen based on an interpreted value of the set of bits. In some aspects, the mapping is such that the sets of bits with nearby interpreted values are mapped to nearby modulation symbols. The interpreted values of the set of bits may represent an LLR value.

At 710, the wireless relay node transmits the first modulation symbol to the second wireless node.

Figure 8:
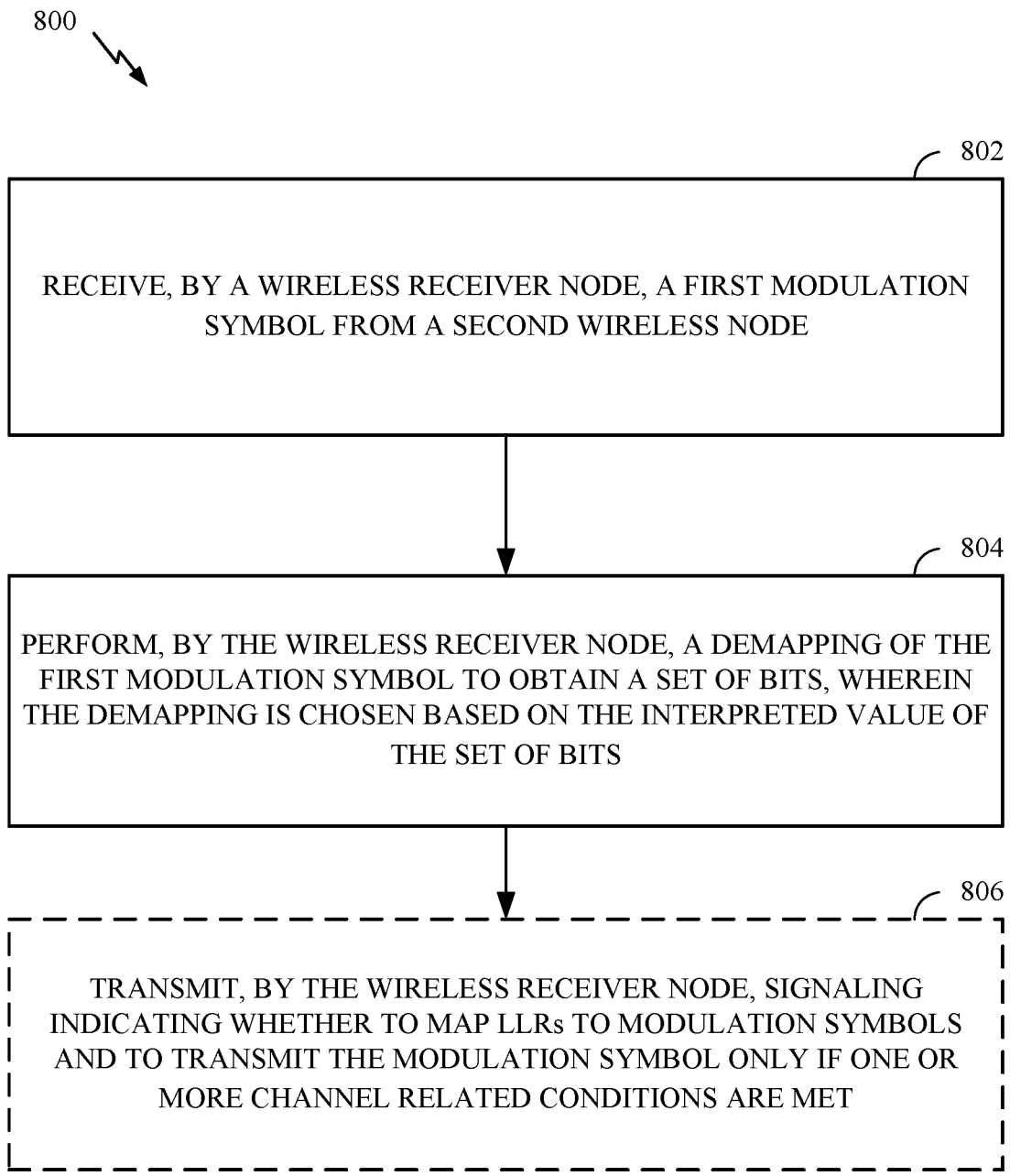
FIG. 8 is a flow diagram illustrating example operations for wireless communications by a wireless receiver node, in accordance with certain aspects of the present disclosure.

FIG. 8 illustrates example operations 800 for wireless communication by a wireless receiver node, in accordance with certain aspects of the present disclosure. The operations 800 may be performed, for example, by a wireless receiver node (e.g., any of UEs or APs/gNBs or UEs shown in FIG. 1, 2, or 6) to receive and process a packet from a relay node (performing operations 700).

Operations 800 begin, at 802, with the wireless receiver node receiving a first modulation symbol from a second wireless node (e.g., the wireless relay node).

At 804, the wireless receiver node performs a demapping of the first modulation symbol to obtain a set of bits, wherein the demapping is chosen based on an interpreted value of the set of bits.

In some aspects, at 806, the wireless receiver node may transmit signaling indicating whether the second wireless node mapped LLRs to modulation symbols according to the mapping and transmitted the modulation symbols only if one or more channel related condition were met. The transmission by the wireless receiver node may occur prior to the wireless relay node performs mapping of the LLRs to modulation symbols.

Figure 9:
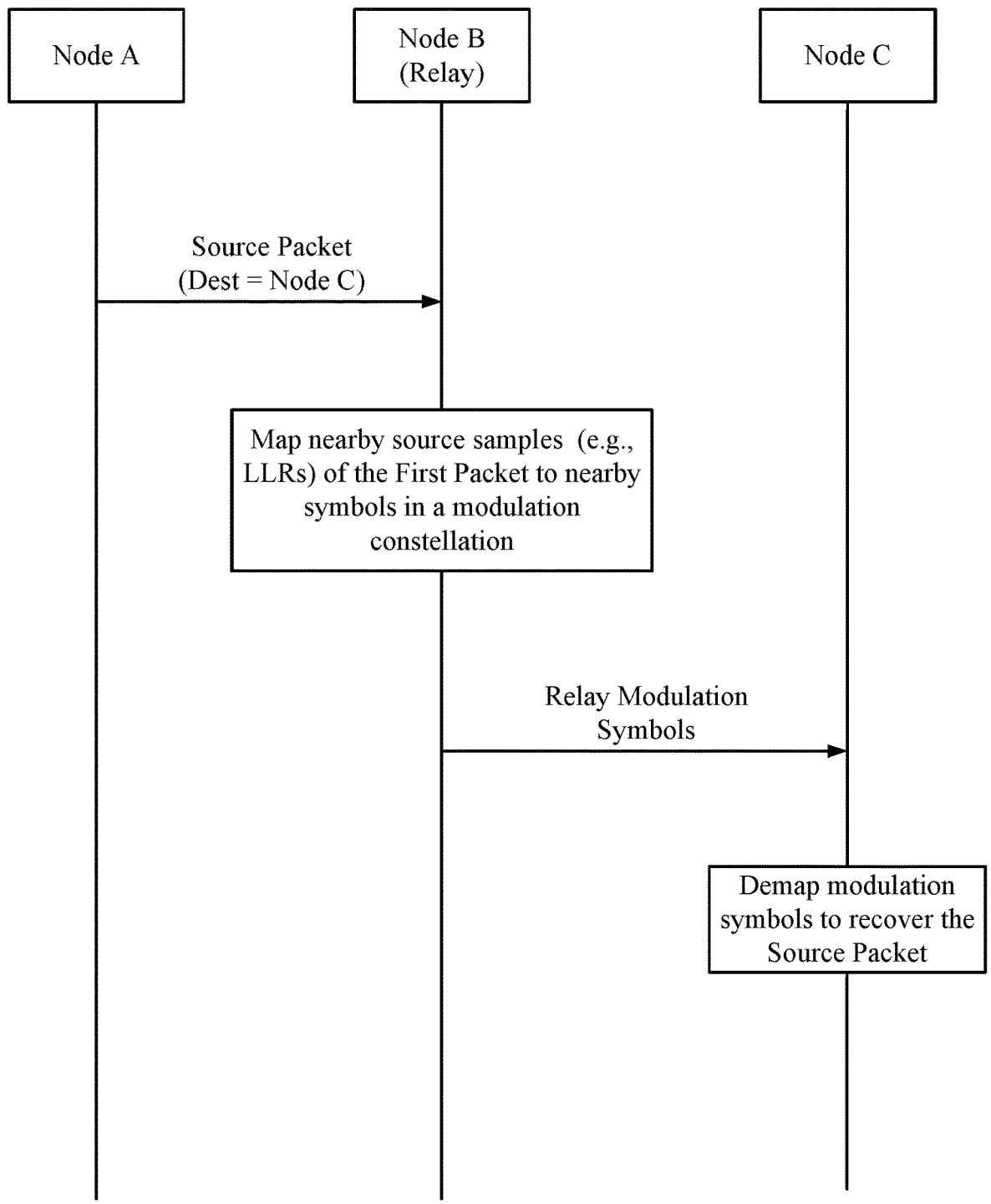
FIG. 9 is a call flow diagram illustrating example signaling for relaying pre-decoded samples of a packet, in accordance with certain aspects of the present disclosure.

Operations 700 and 800 of FIGS. 7 and 8 may be understood with reference to the call flow diagram 900 of FIG. 9, which shows one example use case where pre-decoded samples of a relayed packet are mapped to a modulation symbol. As shown, a wireless relay node (e.g., Node B) relays a source packet from a wireless transmitter node (e.g., Node A) to a wireless receiver node (e.g., Node C). In other words, Node B may perform operations 700 of FIG. 7 while Node C performs operations 800 of FIG. 8.

As illustrated in FIG. 9, Node A may transmit a first data packet to Node B. Node B maps bits representing pre-decoded samples (e.g., LLRs, I-Q samples, etc.) of the first data packet to modulation symbols. Node B then transmits a second data packet with modulation symbols to Node C. Node C performs a demapping of the modulation symbols to recover the first data packet.

To enable the mapping of pre-decoded samples to modulation symbols described herein, the wireless receiver node may have sufficient information to understand the content of the relayed packets (e.g., type of pre-decoded samples) from the wireless relay node, and the mapping of the samples to modulation symbols in order to demap to recover the underlying packet. In some cases, the nodes (e.g., the wireless relay node and the wireless receiver node) (shown in FIG. 9) may coordinate the mapping used by the wireless relay node (Node B) of pre-decoded samples to modulation symbols a modulation constellation. The mapping may be set by Node A, B, C, or a coordinating central node (such as a BS or an AP), or by a combination of these nodes working in coordination with each other.

As noted, the wireless relay node (e.g., node B) maps LLRs to the modulation symbols of a modulation constellation, and relays those LLRs via the modulation symbols. For example, an 8-bit LLR with value range −128 to 127 may be mapped to the 256 points in a 256 pulse amplitude modulation (PAM) constellation. In some cases, a quadrature amplitude modulation (QAM) constellation may be used for mapping a pair of LLRs.

The pairs of LLRs chosen may themselves correspond to bits on the in-phase and quadrature (IQ) branch of the modulation constellation used by the wireless transmitter node (e.g., Node A). Some cases may apply to multiphase shift keying (M-PSK) constellation (e.g., 256-PSK, with the range −128 to 127 mapped to successive points on the constellation). Mapping LLR values to constellation points may bypass the grey-coding mapping of bits to QAM constellation points.

In some cases, the LLRs may be translated to a continuous and/or infinite resolution modulation symbol and the symbol may be created from the LLR. The translation to a continuous and/or infinite resolution modulation symbol may be similar to direct transmission of received modulation symbol described below, except the symbol may be created from the LLR instead.

In some cases, the modulation scheme used for relaying the LLRs may be the same as that used by the wireless transmitter node when transmitting to the relay node.

Mapping nearby data samples to nearby symbols in a modulation constellation may increase the robustness of the transmission (of LLRs or any other values) to noise. While a received modulation symbol after channel equalization may map to one of the constellation points, the received modulation system may not map exactly to the correct constellation point due to noise. In some cases, the noise may cause even the nearest-point mapping to be inaccurate.

Mapping nearby pre-decoded samples to nearby symbols in the modulation constellation may account for inaccuracies due to transmission errors. Small differences between two LLRs may not impact the decoder performance because for example, LLR values of 1.0 and 0.9 are "effectively" the same. However, errors in transmission and/or reception may result from confusing a modulation constellation point with another nearby modulation constellation point. Depending on the mapping, the difference in recovered value may be significant.

Figure 10A:
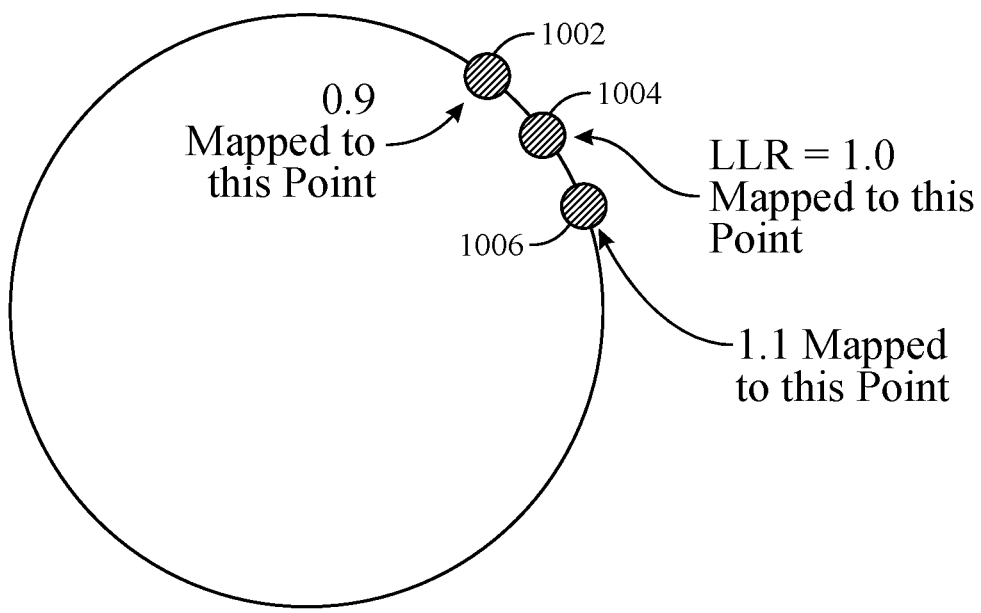
FIGS. 10A and 10B are example mappings of pre-decoded samples to modulation symbols of a modulation constellation, in accordance with certain aspects of the present disclosure.
Figure 10B:
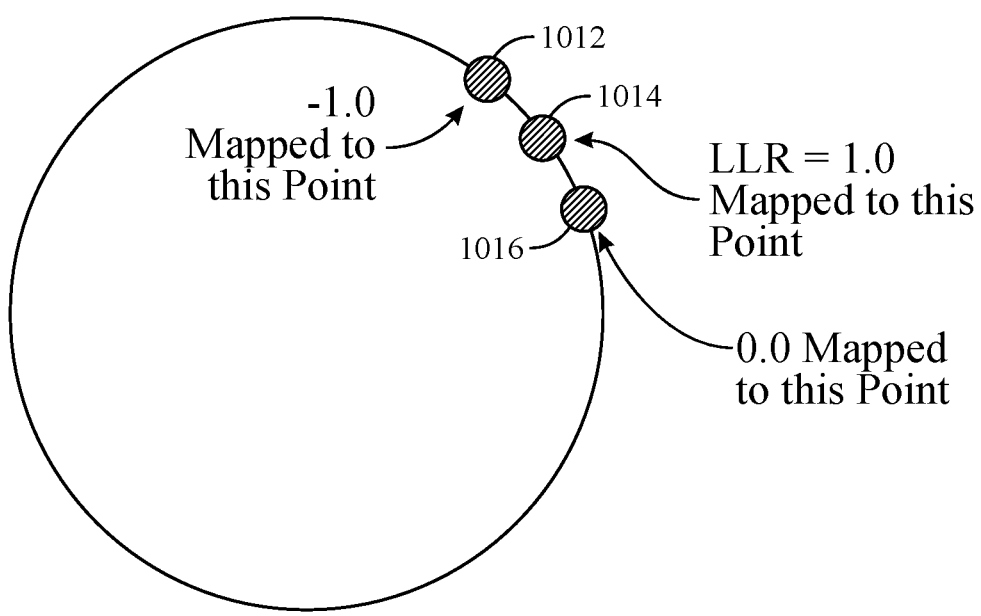

For example, FIGS. 10A and 10B illustrate two example mappings of LLRs to constellation points. As shown in FIG. 10A, LLRs (e.g., different LLR values) may be mapped to constellation points such that nearby LLR values are mapped to nearby constellation points. In the illustrated example, an LLR value of 0.9 is mapped to point 1002, LLR value of 1.0 is mapped to nearby point 1004, and LLR value of 1.1 is mapped to nearby point 1006. Thus, if a transmission or reception error occurs, the error may result in confusing an LLR value of 1.0 with an LLR value of 0.9 or 1.1. This relatively small error may result in a small degradation of decoder performance.

On the other hand, if the constellation points are mapped to LLR values that are not close or nearby in value, as illustrated in FIG. 10B, the error may be larger than the example described above. In the example illustrated in FIG. 10B, an LLR value −1.0 is mapped to point 1012, LLR value 1.0 mapped to nearby point 1014, and LLR value 0.0 mapped to nearby point 1016. With this mapping, the same error in transmission or reception described above may result in a significantly different LLR value than intended, which may cause more degradation on decoder performance.

In some aspects, each modulation symbol may be quantized (e.g., both I and Q values for complex constellations), and the quantized symbol may be relayed. The quantized symbol may also be source-coded and/or compressed prior to being relayed. In some aspects, the wireless relay node may transmit the received modulation symbol directly. According to some aspects, if two original modulation symbols were close in value, the corresponding relayed symbols also are likely close.

In some cases, to accommodate for aspects of the present invention, a transmitter may need to be able to transmit an arbitrary modulation symbol (e.g., an arbitrary I-Q modulation symbol).

Aspects of the present disclosure may be applied for use cases other than relaying. For example, as an alternative (or in addition) to transmitting LLR values, the techniques may be used to transmit a packet representing an image, with pixel intensities mapped to constellation points. The mapping may be performed such that nearby pixel intensity values are mapped to nearby constellation points.

Aspects of the present disclosure may be applied subject to signal-to-noise ratio (SNR) threshold conditions. Because direct symbol mapping represents uncoded transmission (and, therefore lacks coding gain), a high SNR may be needed for error-free transmission. This error-free transmission requirement may be relaxed to some extent using the techniques presented herein, if the modulation mapping is chosen to be robust to errors. For the relaying case, an SNR threshold at the relay node may be applied on an inbound link, an outbound link, or both (with possibly different SNR threshold levels). In some cases, such application of an SNR threshold may be indicated, for example, by Uu, sidelink radio resource control (RRC) configuration, medium access control (MAC) control element (MAC-CE), or physical (PHY) and/or layer-1 (L1) control (e.g., downlink control information (DCI), sidelink control information (SCI), uplink control information (UCI)).

Figure 11:
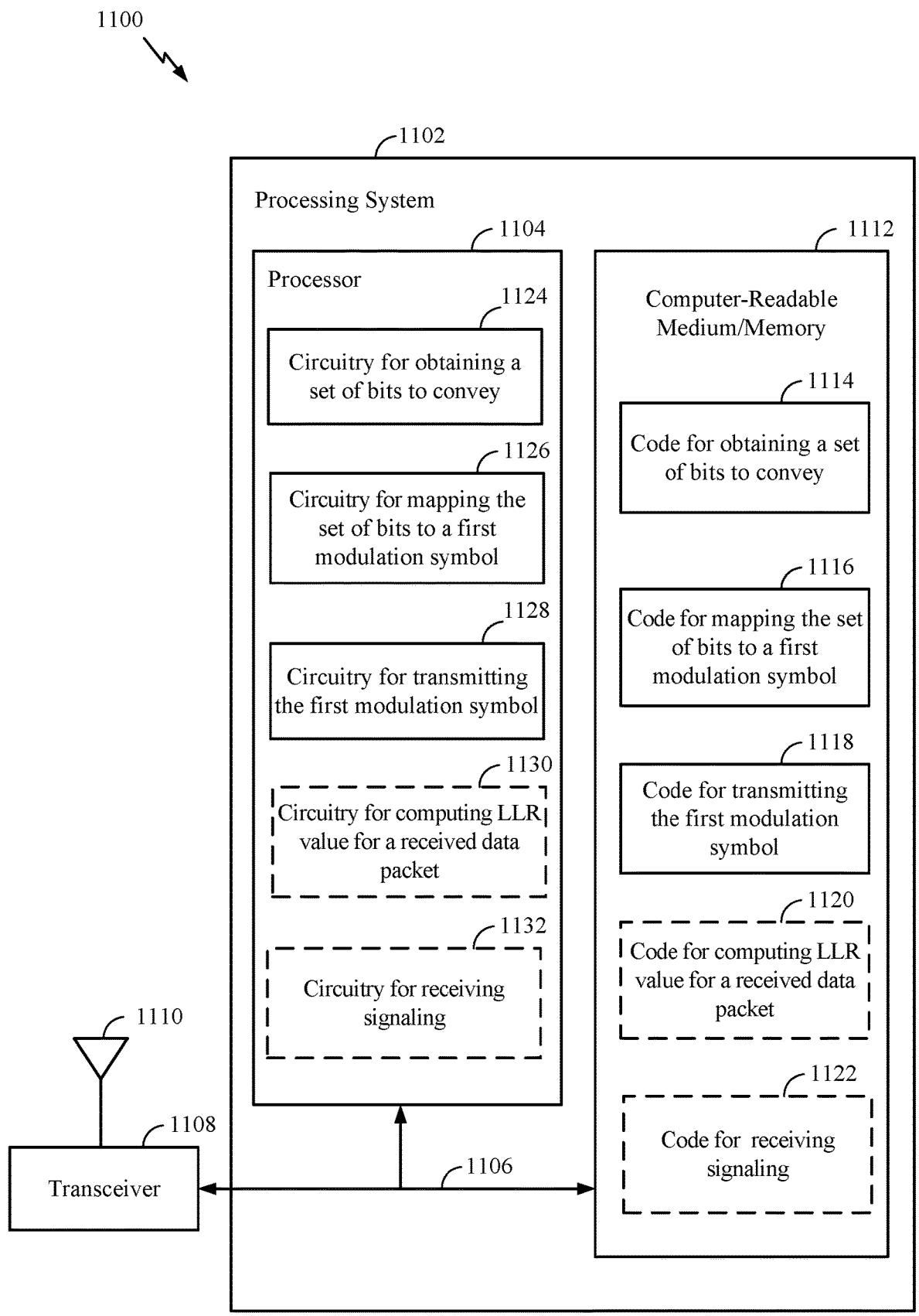
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 7. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 7, or other operations for performing the various techniques discussed herein for joint source channeling for efficiently transmitting a set of bits mapped to a modulation symbol. In certain aspects, computer-readable medium/memory 1112 stores code 1114 for obtaining a set of bits to convey to a second wireless node; code 1116 for mapping the set of bits to a first modulation symbol of a set of modulation symbols, wherein the mapping is chosen based on an interpreted value of the set of bits; and code 1118 for transmitting the first modulation symbol to the second wireless node. In certain aspects, the processor 1104 has circuitry configured to implement the code stored in the computer-readable medium/memory 1112. In certain aspects, the computer-readable medium/memory 1112 may store code 1120 for computing the LLR value for a received data packet, to be relayed to the second wireless node that has not been decoded. In certain aspects, the computer-readable medium/memory 1112 may store code 1122 for receiving signaling indicating whether or not apparatus is to map LLRs to modulation symbols according to the mapping and transmits the modulation symbols to the second wireless node only if one or more channel related conditions are met. The processor 1104 includes circuitry 1124 for obtaining a set of bits to convey to a second wireless node; circuitry 1126 for mapping the set of bits to a first modulation symbol of a set of modulation symbols, wherein the mapping is chosen based on an interpreted value of the set of bits; and circuitry 1128 for transmitting the first modulation symbol to the second wireless node. In certain aspects, the processor 1104 may include circuitry 1124 for computing the LLR value for a received data packet, to be relayed to the second wireless node that has not been decoded. In certain aspects, the processor 1104 may include circuitry 1122 for receiving signaling indicating whether or not apparatus is to map LLRs to modulation symbols according to the mapping and transmits the modulation symbols to the second wireless node only if one or more channel related conditions are met.

For example, means for transmitting (or means for outputting for transmission) may include a transmitter and/or an antenna(s) 234 or the BS 110a or the transmitter unit 254 and/or antenna(s) 252 of the UE 120a illustrated in FIG. 2 and/or circuitry 1128 of the communication device 1100 in FIG. 11. Means for receiving (or means for obtaining) may include a receiver and/or an antenna(s) 234 of the BS 110a or a receiver and/or antenna(s) 252 of the UE 120a illustrated in FIG. 2 and/or circuitry 1124 of the communication device 1100 in FIG. 11. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110a or the receive processor 258, the transmit processor 264, the TX MIMO processor 266, and/or the controller/processor 280 of the UE 120a illustrated in FIG. 2 and/or the processing system 1102 of the communication device 1100 in FIG. 11.

Figure 12:
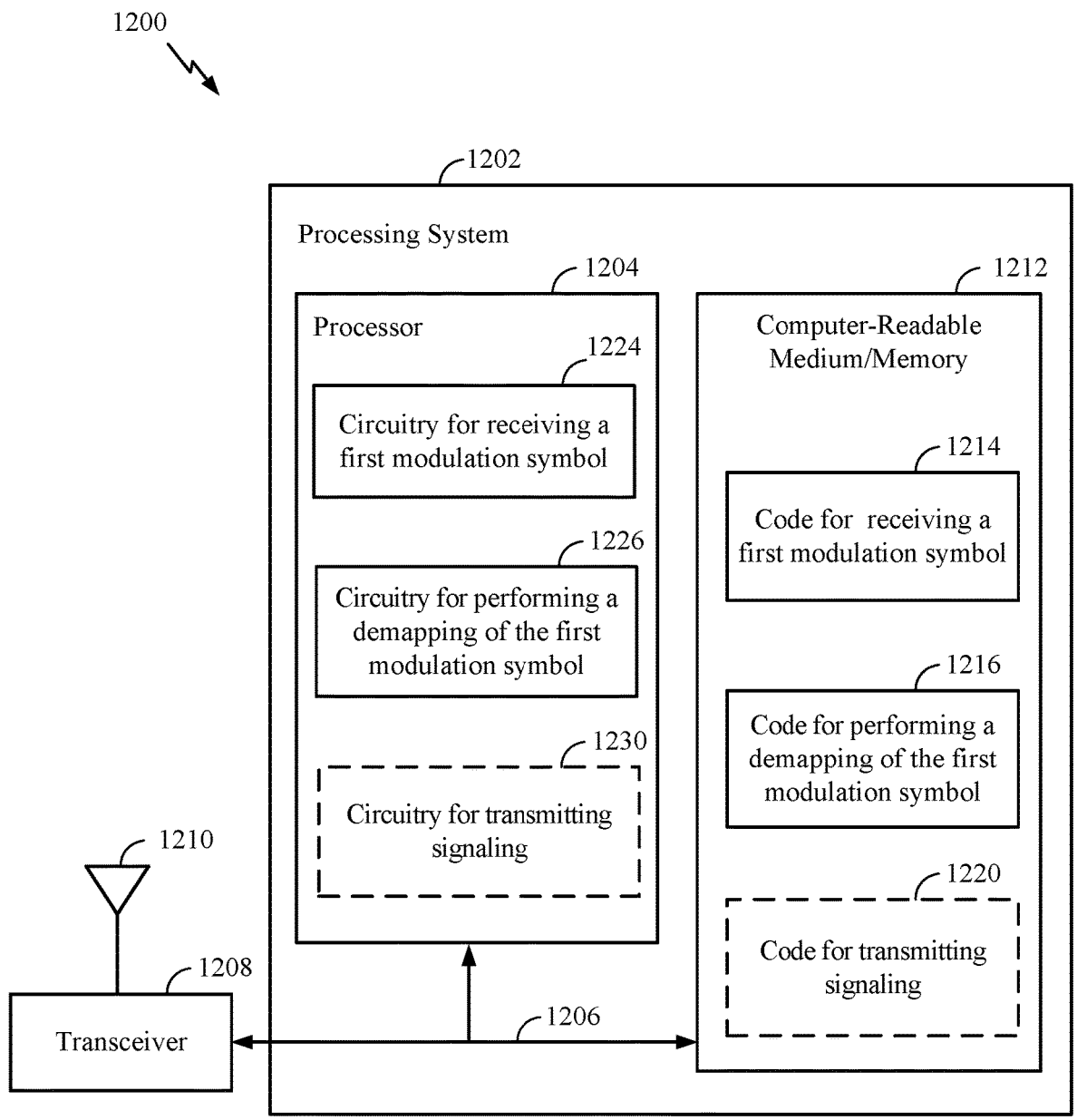
FIG. 12 illustrates a communications device that may include various components configured to perform operations for the techniques disclosed herein in accordance with aspects of the present disclosure.

FIG. 12 illustrates a communications device xx00 that may include various components (e.g., corresponding to means-plus-function components) configured to perform operations for the techniques disclosed herein, such as the operations illustrated in FIG. 8. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor xx04 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 8, or other operations for performing the various techniques discussed herein for joint source channeling for efficiently transmitting a set of bits mapped to a modulation symbol. In certain aspects, computer-readable medium/memory 1212 stores code 1214 for receiving a first modulation symbol from a second wireless node; and code 1216 for performing a demapping of the first modulation symbol to obtain a set of bits, wherein the demapping is chosen based on an interpreted value of the set of bits. In certain aspects, the computer-readable medium/memory 1212 may store code 1220 for transmitting signaling indicating whether or not the second wireless node is to map LLRs to modulation symbols according to the mapping and transmit the modulation symbols to the first wireless node only if one or more channel related conditions are met. In certain aspects, the processor 1204 has circuitry configured to implement the code stored in the computer-readable medium/memory 1212. The processor 1204 includes circuitry 1224 for receiving a first modulation symbol from a second wireless node; circuitry 1226 for performing a demapping of the first modulation symbol to obtain a set of bits, wherein the demapping is chosen based on an interpreted value of the set of bits. In certain aspects, the processor 1204 may include circuitry 1230 for transmitting signaling indicating whether or not the second wireless node is to map LLRs to modulation symbols according to the mapping and transmit the modulation symbols to the first wireless node only if one or more channel related conditions are met.

For example, means for transmitting (or means for outputting for transmission) may include a transmitter and/or an antenna(s) 234 or the BS 110a or the transmitter unit 254 and/or antenna(s) 252 of the UE 120a illustrated in FIG. 2. Means for receiving (or means for obtaining) may include a receiver and/or an antenna(s) 234 of the BS 110a or a receiver and/or antenna(s) 252 of the UE 120a illustrated in FIG. 2 and/or circuitry 1224 of the communication device 1200 in FIG. 12. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110a or the receive processor 258, the transmit processor 264, the TX MIMO processor 266, and/or the controller/processor 280 of the UE 120a illustrated in FIG. 2 and/or the processing system 1202 of the communication device 1200 in FIG. 12.

Example Aspects

Implementation examples are described in the following numbered aspects:

Aspect 1: A method for wireless communications by a first wireless node, comprising: obtaining a set of bits to convey to a second wireless node; mapping the set of bits to a first modulation symbol of a set of modulation symbols, wherein the mapping is chosen based on an interpreted value of the set of bits; and transmitting the first modulation symbol to the second wireless node.

Aspect 2: The method of aspect 1, wherein the mapping is such that sets of bits with nearby interpreted values are mapped to nearby modulation symbols.

Aspect 3: The method of any of aspects 1-2, where the interpreted value of the set of bits represents a log likelihood ratio (LLR) value.

Aspect 4: The method of aspect 3, further comprising: computing the LLR value for a received data packet, to be relayed to the second wireless node that has not been decoded.

Aspect 5: The method of aspect 4, wherein the first wireless node uses a different modulation scheme to relay LLRs to the second wireless node than is used to transmit a data packet.

Aspect 6: The method of any of aspects 4-5, wherein the first wireless node maps LLRs to modulation symbols according to the mapping and transmits the modulation symbols to the second wireless node only if one or more channel related conditions are met.

Aspect 7: The method of aspect 6, wherein the one or more conditions involve applying a signal to noise ratio (SNR) threshold to at least one of an inbound link or outbound link of the first wireless node.

Aspect 8: The method of aspect 7, further comprising receiving signaling indicating whether or not the first wireless node is to map LLRs to modulation symbols according to the mapping and transmits the modulation symbols to the second wireless node only if one or more channel related conditions are met.

Aspect 9: The method of aspect 8, wherein the signaling comprises at least one of: radio resource control (RRC), medium access control (MAC) control element (CE), or physical layer (PHY) signaling.

Aspect 10: The method of any of aspects 1-9, where the interpreted value of the set of bits represents a pixel intensity of an image.

Aspect 11: A method for wireless communications by a first wireless node, comprising: receiving a first modulation symbol from a second wireless node; and performing a demapping of the first modulation symbol to obtain a set of bits, wherein the demapping is chosen based on an interpreted value of the set of bits.

Aspect 12: The method of aspect 11, wherein the demapping is such that nearby modulation symbols are demapped to sets of bits with nearby interpreted values.

Aspect 13: The method of any of aspects 11-12, where the interpreted value of the set of bits represents a log likelihood ratio (LLR) value.

Aspect 14: The method of aspect 13, wherein the LLR value was computed by the second wireless node for a received data packet, to be relayed to the first wireless node.

Aspect 15: The method of aspect 14, wherein the second wireless node uses a different modulation scheme to relay LLRs to the first wireless node than is used to transmit a data packet.

Aspect 16: The method of any of aspects 14-15, wherein the second wireless node maps LLRs to modulation symbols according to a mapping and transmits the modulation symbols to the second first wireless node only if one or more channel related conditions are met.

Aspect 17: The method of aspect 16, wherein the one or more conditions involve applying a signal to noise ratio (SNR) threshold to at least one of an inbound link or outbound link of the first wireless node.

Aspect 18: The method of aspect 17, further comprising receiving transmitting signaling indicating whether or not the first second wireless node is to map LLRs to modulation symbols according to the mapping and transmits the modulation symbols to the second first wireless node only if one or more channel related conditions are met.

Aspect 19: The method of aspect 18, wherein the signaling comprises at least one of: radio resource control (RRC), medium access control (MAC) control element (CE), or physical layer (PHY) signaling.

Aspect 20: The method of any of aspects 11-19, where the interpreted value of the set of bits represents a pixel intensity of an image.

Aspect 21: An apparatus comprising means for performing the method of any of aspects 1 through 20.

Aspect 22: An apparatus comprising at least one processor and a memory coupled to the at least one processor, the memory comprising code executable by the at least one processor to cause the apparatus to perform the method of any of aspects 1 through 20.

Aspect 23: A computer readable medium storing computer executable code thereon for wireless communications that, when executed by at least one processor, cause an apparatus to perform the method of any of aspects 1 through 20.

The techniques described herein may be used for various wireless communication technologies, such as NR (e.g., 5G NR), LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. An AP may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). An AP for a macro cell may be referred to as a macro AP. An AP for a pico cell may be referred to as a pico AP. An AP for a femto cell may be referred to as a femto AP or a home AP.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with an AP, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., an AP) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Access points are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the described method. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software stored on the machine-readable media. A storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

What is claimed is:

1. An apparatus for wireless communications, comprising:
   at least one processor; and
   memory coupled to the at least one processor, the memory comprising code executable by the at least one processor to cause the apparatus to:
      obtain a set of bits to convey to a first wireless node;
      map the set of bits to a first modulation symbol of a set of modulation symbols based on an interpreted value of the set of bits, wherein the interpreted value of the set of bits represents a log-likelihood ratio (LLR) value determined based upon a received data packet, to be relayed to the first wireless node, which has not been decoded; and
      transmit the first modulation symbol to the first wireless node when one or more channel related conditions are met.

2. The apparatus of claim 1, wherein the code executable by the at least one processor to cause the apparatus to map comprises code executable by the at least one processor to cause the apparatus to map sets of bits with nearby interpreted values to nearby modulation symbols.

3. The apparatus of claim 1, wherein the memory further comprises code executable by the at least one processor to cause the apparatus to use a different modulation scheme to relay LLRs to the first wireless node than is used to transmit a data packet.

4. The apparatus of claim 1, wherein the one or more conditions involve applying a signal to noise ratio (SNR) threshold to at least one of an inbound link or outbound link of the apparatus.

5. The apparatus of claim 4, wherein the memory further comprises code executable by the at least one processor to cause the apparatus to receive signaling indicating whether or not the apparatus is to map LLRs to modulation symbols and transmit the modulation symbols to the first wireless node only if one or more channel related conditions are met.

6. The apparatus of claim 5, wherein the signaling comprises at least one of: radio resource control (RRC), medium access control (MAC) control element (CE), or physical layer (PHY) signaling.

7. The apparatus of claim 1, wherein the interpreted value of the set of bits represents a pixel intensity of an image.

8. An apparatus for wireless communications, comprising:
   at least one processor; and
   memory coupled to the at least one processor, the memory comprising code executable by the at least one processor to cause the apparatus to:
      receive a first modulation symbol from a first wireless node when one or more channel conditions are met; and
      perform a demapping of the first modulation symbol to obtain a set of bits based on an interpreted value of the set of bits, wherein the interpreted value of the set of bits represents a log-likelihood ratio (LLR) value determined based upon a data packet to be relayed to the apparatus, from the first wireless node, which has not been decoded.

9. The apparatus of claim 8, wherein the code executable by the at least one processor to cause the apparatus to demap comprises code executable by the at least one processor to cause the apparatus to demap nearby modulation symbols to sets of bits with nearby interpreted values.

10. The apparatus of claim 8, wherein:
the first wireless node uses a different modulation scheme to relay LLRs to the apparatus than is used to transmit a data packet.

11. The apparatus of claim 8, wherein the one or more conditions involve applying a signal to noise ratio (SNR) threshold to at least one of an inbound link or outbound link of the first wireless node.

12. The apparatus of claim 11, wherein the memory further comprises code executable by the at least one processor to cause the apparatus to transmit signaling indicating whether or not the first wireless node is to map LLRs to modulation symbols according to the mapping and transmit the modulation symbols to the apparatus only if one or more channel related conditions are met.

13. The apparatus of claim 12, wherein the signaling comprises at least one of: radio resource control (RRC), medium access control (MAC) control element (CE), or physical layer (PHY) signaling.

14. The apparatus of claim 8, wherein the interpreted value of the set of bits represents a pixel intensity of an image.

15. A method for wireless communications by a first wireless node, comprising:
obtaining a set of bits to convey to a second wireless node;
mapping the set of bits to a first modulation symbol of a set of modulation symbols based on an interpreted value of the set of bits, wherein the interpreted value of the set of bits represents a log-likelihood ratio (LLR) value determined based upon a received data packet, to be relayed to the first wireless node, which has not been decoded; and
transmitting the first modulation symbol to the second wireless node when one or more channel related conditions are met.

16. The method of claim 15,
wherein the one or more conditions involve applying a signal to noise ratio (SNR) threshold to at least one of an inbound link or outbound link of the first wireless node.

17. The method of claim 15, further comprising receiving signaling indicating whether or not the first wireless node is to map LLRs to modulation symbols according to the mapping and transmit the modulation symbols to the second wireless node only if one or more channel related conditions are met.

18. A method for wireless communications by a first wireless node, comprising:
receiving a first modulation symbol from a second wireless node when one or more channel conditions are met; and
performing a demapping of the first modulation symbol to obtain a set of bits based on an interpreted value of the set of bits, wherein the interpreted value of the set of bits represents a log-likelihood ratio (LLR) value determined based upon a data packet to be relayed to the first wireless node, from the second wireless node, which has not been decoded.

19. The method of claim 18,
wherein the one or more conditions involve applying a signal to noise ratio (SNR) threshold to at least one of an inbound link or outbound link of the first wireless node.

20. The method of claim 18, further comprising transmitting signaling indicating whether or not the second wireless node is to map LLRs to modulation symbols according to the mapping and transmit the modulation symbols to the first wireless node only if one or more channel related conditions are met.

* * * * *